(12) United States Patent
Zhang

(10) Patent No.: US 11,318,728 B1
(45) Date of Patent: May 3, 2022

(54) SCREEN PROTECTOR APPLICATOR

(71) Applicant: Ping Zhang, Cranberry Township, PA (US)

(72) Inventor: Ping Zhang, Cranberry Township, PA (US)

( * ) Notice: Subject to any disclaimer, the term of this patent is extended or adjusted under 35 U.S.C. 154(b) by 0 days.

(21) Appl. No.: 17/576,979

(22) Filed: Jan. 16, 2022

(30) Foreign Application Priority Data

Sep. 10, 2021 (CN) .......................... 202122199520.8

(51) Int. Cl.
*B32B 38/18* (2006.01)
*B32B 38/16* (2006.01)
*B32B 37/12* (2006.01)
*B32B 37/00* (2006.01)

(52) U.S. Cl.
CPC ...... *B32B 38/1841* (2013.01); *B32B 37/0046* (2013.01); *B32B 37/1292* (2013.01); *B32B 38/162* (2013.01); *B32B 2457/20* (2013.01)

(58) Field of Classification Search
CPC ............ B32B 38/1841; B32B 37/0046; B32B 37/1292; B32B 38/162; B32B 2457/20
See application file for complete search history.

(56) References Cited

U.S. PATENT DOCUMENTS

| 9,688,016 B2 * | 6/2017 | Rostami | B29C 63/0004 |
| 2014/0124146 A1 * | 5/2014 | Patel | B29C 63/0004 156/574 |
| 2017/0297268 A1 * | 10/2017 | Witham | H04B 1/3888 |

* cited by examiner

*Primary Examiner* — Vishal I Patel
(74) *Attorney, Agent, or Firm* — IPro, PLLC

(57) ABSTRACT

This disclosure relates a screen protector applicator that comprises a tray and two guide insert pins. The tray comprises a frame with an accommodating groove for accommodating a device, the frame includes two oppositely arranged long sides and two oppositely arranged short sides, surrounding the accommodating groove. Each guide insert pin comprises a connecting plate and a guide protrusion, wherein the connecting plate is slidably connected to the frame, the guide protrusion comprises a first protrusion, the first protrusion is fixedly connected to the connecting plate, the first protrusion is provided with a first inclined surface, the first inclined surface faces away from the accommodating groove, and the first inclined surface is inclined in a downward direction. With the above arrangement, two ends of a screen protector each can be gradually flatly attached to the device by pulling away the two guide insert pins.

17 Claims, 4 Drawing Sheets

SCREEN PROTECTOR APPLICATOR

TECHNICAL FIELD

The present disclosure relates to the technical field of screen protector application for electronic equipment, and in particular to a screen protector applicator.

BACKGROUND

Nowadays, electronic equipment such as mobile phones and tablets has become indispensable tools in many people's lives. In order to facilitate users to apply screen protectors (also referred to as films or protective films) on the screens of electronic equipment, screen protector applicators came into being.

However, the current screen protector applicators have poor quality of screen protector application.

SUMMARY

The present disclosure provides a screen protector applicator to solve the technical problem in the prior art that the screen protector applicators have poor quality of screen protector application.

To solve the above technical problem, the present disclosure provides a screen protector applicator, comprising:

a tray comprising a frame, wherein the frame is provided with an accommodating groove for accommodating a protector-to-be-applied device, the frame includes two oppositely arranged long sides and two oppositely arranged short sides, and the two long sides and the two short sides surround the accommodating groove; and a guide insert pin comprising a connecting plate and a guide protrusion, wherein the connecting plate is slidably connected to the frame, the guide protrusion comprises a first protrusion, the first protrusion is fixedly connected to the connecting plate, the first protrusion is provided with a first inclined surface, the first inclined surface faces away from the accommodating groove, the first inclined surface extends along the first protrusion to above the accommodating groove and is inclined in a downward direction, the first protrusion is used to extend above the accommodating groove, and the first inclined surface is used to guide a screen protector to gradually detach from the first inclined surface and gradually flatly attach to a protector-to-be-applied surface of the protector-to-be-applied device and wherein two guide insert pins are provided on the two short sides, respectively.

In some embodiments, the guide protrusion comprises two first protrusions spaced apart.

In some embodiments, the guide protrusion further comprises two second protrusions spaced apart, the second protrusions are fixedly connected to the connecting plate, and the two second protrusions are located between the two first protrusions, wherein the second protrusion is provided with a second inclined surface, the first inclined surface is arranged at a first angle with a plane where the accommodating groove is located, the second inclined surface is arranged at a second angle with the plane where the accommodating groove is located, and the second angle is smaller than the first angle.

In some embodiments, the connecting plate comprises a connecting portion and a push-pull portion, two connecting portions are fixedly connected to opposite sides of the push-pull portion, respectively, each of the connecting portions extends out of the push-pull portion, and the two first protrusions and the two second protrusions are fixedly connected in pairs to a surface of a part of the two connecting portions extending out of the push-pull portion.

In some embodiments, the part of the connecting portion extending out of the push-pull portion has an end away from the push-pull portion, and the first inclined surface is closer to the end than the second inclined surface.

In some embodiments, the guide insert pin further comprises an abutting portion fixedly connected to the connecting plate, the tray further comprises a limiting plate fixedly connected to the frame, and the abutting portion is used for abutting against the limiting plate to limit a sliding stroke of the guide insert pin relative to the frame.

In some embodiments, the tray is provided with a limiting groove, and the connecting plate is slidably inserted into the limiting groove.

In some embodiments, the tray further comprises a limiting plate fixedly connected to the frame, the limiting plate comprises a vertical plate and a horizontal plate, an end of the vertical plate is fixedly connected to the frame, an end of the horizontal plate is fixedly connected to a side wall of the vertical plate, the vertical plate, the horizontal plate and the frame enclose to form the limiting groove therebetween, and a gap is provided between the connecting plate and the horizontal plate.

In some embodiments, the tray further comprises a limiting protrusion, a plurality of limiting protrusions are each fixedly connected to the long side, and the limiting protrusion is used to limit the protector-to-be-applied device.

In some embodiments, the screen protector applicator further comprises:

an adsorbing member, wherein the long side of the frame is provided with a through groove, the through groove penetrates the long side, and the adsorbing member is provided in the through groove.

The present disclosure further provides a screen protector application method, comprising:

placing the tray of any one of the screen protector applicators described above on a protector-to-be-applied device, so that a protector-to-be-applied surface of the protector-to-be-applied device is located in the accommodating groove of the tray, and inserting a guide insert pin on each end of the tray;

dropping glue on the protector-to-be-applied surface of the protector-to-be-applied device;

placing a screen protector on the protector-to-be-applied surface of the protector-to-be-applied device, so that opposite sides of the screen protector are placed on the first inclined surfaces of the two guide insert pins, and the guide protrusions are located between the protector-to-be-applied device and the screen protector; and pulling away the two guide insert pins at the same time, so that the screen protector is gradually attached to the protector-to-be-applied surface of the protector-to-be-applied device.

In some embodiments, said dropping droplets of glue on the protector-to-be-applied surface of the protector-to-be-applied device comprises:

dropping two droplets of glue on the protector-to-be-applied surface of the protector-to-be-applied device, so that a distance between each droplet of glue and one long side is equal to a distance between the droplet of glue and the other long side, and a distance between each droplet of glue and the other droplet of glue is equal to a distance between the droplet of glue and an adjacent short side.

In some embodiments, the screen protector application method further comprises: cleaning the protector-to-be-applied surface of the protector-to-be-applied device before said placing the screen protector applicator on the protector-to-be-applied device.

In some embodiments, each long side of the frame is provided with a through groove penetrating the long side, and the screen protector application method further comprises providing an adsorbing member in the through groove before said dropping glue on the protector-to-be-applied surface of the protector-to-be-applied device.

Compared with the prior art, the screen protector applicator of the embodiments of the present disclosure is provided with a guide insert pin on each of two short sides of the frame, so that the two ends of the screen protector each can be gradually flatly attached to the protector-to-be-applied device by pulling away the two guide insert pins, thereby allowing the air between the protector-to-be-applied device and the screen protector to be gradually discharged. As a result, air bubbles can be effectively prevented from being generated between the protector-to-be-applied device and the screen protector during the application process, ensuring the quality of screen protector application. On the one hand, by providing the first inclined surface, when the first protrusion is gradually pulled away from between the protector-to-be-applied device and the screen protector, the screen protector can be gradually flatly attached to the protector-to-be-applied device along the first inclined surface, further preventing air bubbles from being generated between the protector-to-be-applied device and the screen protector during the application process, thereby further ensuring the quality of screen protector application.

Disclosed herein is a screen protector applicator, comprising: a frame configured to accommodate a mobile device; and guide insert pins slidably attached to the frame on opposite sides of the frame; wherein the guide insert pins are configured to support a screen protector thereon such that the screen protector is separate from and parallel to a screen of the mobile device; wherein the guide insert pins are configured to cause the screen protector to approach the screen and to keep the screen protector parallel to the screen, while the guide insert pins are being moved away from one another.

In an aspect, each of the guide insert pins comprises a surface inclined toward the screen and the guide insert pins are configured to support the screen protector with the surfaces.

In an aspect, the surface comprises two edge portions and a center portion between the edge portions; wherein an acute angle between the center portion and the screen is smaller than an acute angle between the edge portions and the screen.

In an aspect, the guide insert pins are configured to be removed from the frame by moving away from one another.

In an aspect, the guide insert pins are slidably attached to the frame by limiting grooves on the frame.

In an aspect, each of the guide insert pins comprises a connecting plate with a connecting portion; wherein the connecting portions of the guide insert pins are accommodated by the limiting grooves.

In an aspect, the connecting plate comprises a push-pull portion; wherein the push-pull portion is configured to engage a finger of a user.

In an aspect, the frame comprises a through groove configured to accommodate an adsorbing member.

In an aspect, each of the guide insert pins comprises an abutting portion configured to limit movement of the guide insert pins toward one another.

Disclosed herein is a method comprising: placing a mobile device into a frame, the frame comprising guide insert pins slidably attached to the frame; placing a screen protector on the guide insert pins, wherein the guide insert pins keep the screen protector separate from and parallel to a screen of the mobile device; and causing the screen protector to approach the screen while keeping the screen protector parallel to the screen, by moving the guide insert pins away from one another.

In an aspect, the method further comprises applying multiple drops of glue on the screen.

In an aspect, the method further comprises causing the screen protector to approach the screen until the screen protector contacts the screen.

In an aspect, the method further comprises placing an absorbing member along the frame.

In an aspect, the method further comprises leveling the screen.

In an aspect, the method further comprises removing dust from the screen.

In an aspect, each of the guide insert pins comprises a surface inclined toward the screen and the guide insert pins are configured to support the screen protector with the surfaces.

In an aspect, the surface comprises two edge portions and a center portion between the edge portions; wherein an acute angle between the center portion and the screen is smaller than an acute angle between the edge portions and the screen.

BRIEF DESCRIPTION OF FIGURES

One or more embodiments are exemplified by corresponding figures in the drawings. These exemplified descriptions do not constitute a limitation on the embodiments. The elements with the same reference numerals in the drawings are denoted as similar elements. Unless otherwise stated, the figures in the drawings do not constitute a scale limitation.

DETAILED DESCRIPTION

In order to facilitate the understanding of the present disclosure, the present disclosure will be described below in more detail with reference to the drawings and specific embodiments. It should be noted that when an element is referred to as being "fixed to"/"mounted to" another element, it may be directly on the another element, or one or more intervening elements may exist therebetween. When an element is referred to as being "connected" to another element, it can be directly connected to the another element, or one or more intervening elements may exist therebetween. The orientation or positional relationships indicated by the terms "upper", "lower", "inner", "outer", "vertical", "horizontal", etc. used in the description are based on the orientation or positional relationships shown in the figures. They are merely for the convenience of describing and simplifying the description of the present disclosure, but not indicating or implying that the device or element referred to must have a specific orientation, or be constructed and operated in a specific orientation. Therefore, they cannot be understood as a limitation of the present disclosure. In addition, the terms "first", "second", etc. are only used for descriptive purposes, and cannot be understood as the indication or implication of relative importance.

Unless otherwise defined, all technical and scientific terms used in the description have the same meanings as commonly understood by those skilled in the technical field of the present disclosure. The terms used in the description of the present disclosure are merely for the purpose of describing specific embodiments, and are not used to limit the present disclosure. The term "and/or" used in the description includes any and all combinations of one or more of the associated listed items.

In addition, the technical features involved in different embodiments of the present disclosure described below can be combined with each other as long as they do not conflict with each other.

Figure 1:
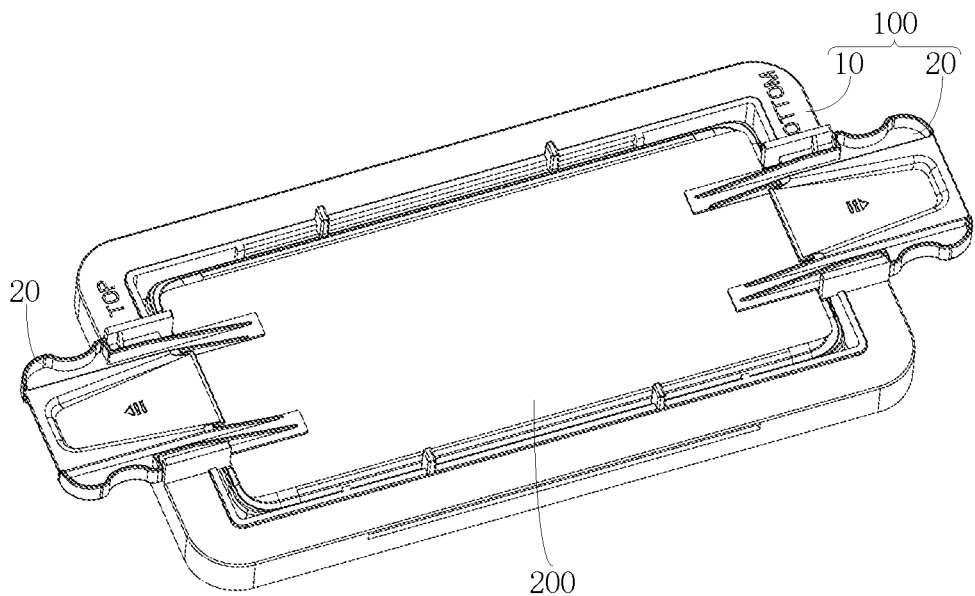
FIG. 1 is a perspective view showing the cooperation between a screen protector applicator according to an embodiment of the present disclosure and a protector-to-be-applied device.

Refer to FIG. 1, which is a perspective view showing the cooperation of a screen protector applicator 100 according to an embodiment of the present disclosure and a protector-to-be-applied device 200 (i.e., a device to which a screen protector is to be applied). An embodiment of the present disclosure provides a screen protector applicator 100 for assisting the protector-to-be-applied device 200 to be applied with a screen protector. The protector-to-be-applied device 200 may be electronic equipment, such as a mobile phone, a tablet computer or the like.

Figure 2:
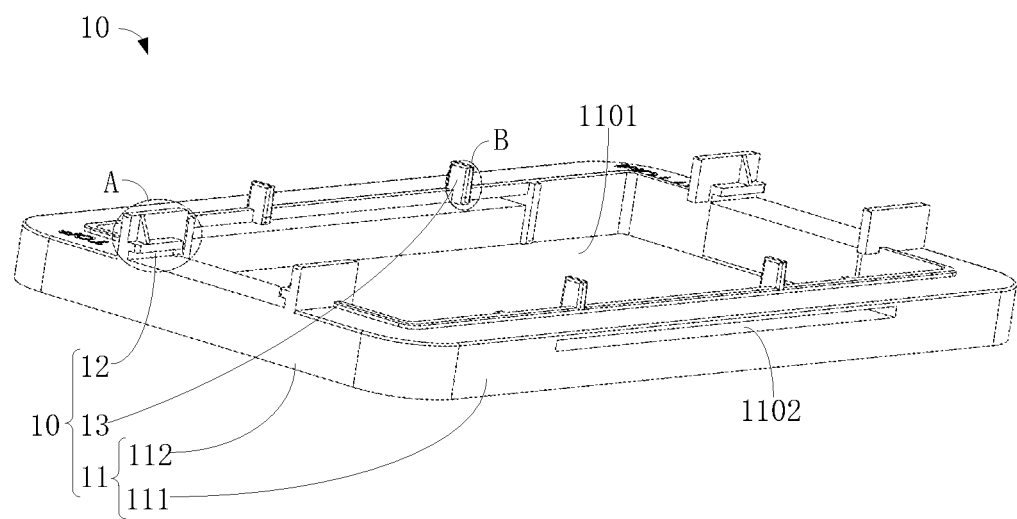
FIG. 2 is a perspective view of a structure of a tray of the screen protector applicator shown in FIG. 1.
Figure 3:
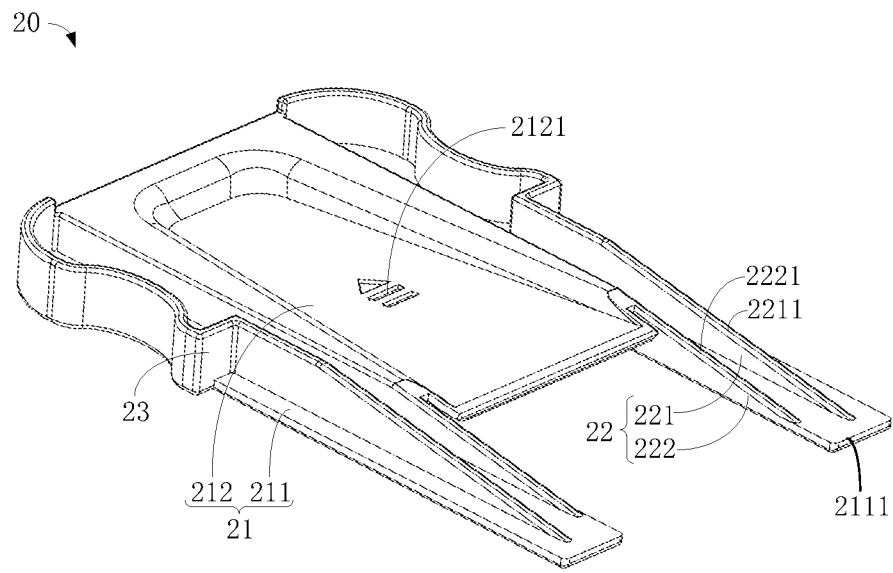
FIG. 3 is a perspective view of a structure of a guide insert pin of the screen protector applicator shown in FIG. 1.

Refer to FIGS. 2 and 3 together, wherein FIG. 2 is a perspective view of a structure of a tray 10 of the screen protector applicator 100 of FIG. 1, and FIG. 3 is a perspective view of a structure of a guide insert pin 20 of the screen protector applicator 100 of FIG. 1. The screen protector applicator 100 comprises the tray 10 and the guide insert pin 20.

The tray 10 comprises a frame 11, which is roughly rectangular frame-shaped. The middle part of the frame 11 is provided with an accommodating groove 1101 adapted to the shape and size of the protector-to-be-applied device 200. The accommodating groove 1101 is roughly rectangular. The accommodating groove 1101 penetrates the frame 11 along the thickness direction of the frame 11, and the accommodating groove 1101 is used for accommodating the protector-to-be-applied device 200. The frame 11 includes two oppositely arranged long sides 111 and two oppositely arranged short sides 112. The two long sides 111 and the two short sides 112 surround the accommodating groove 1101. When the protector-to-be-applied device 200 is accommodated in the accommodating groove 1101, the long sides of the protector-to-be-applied device 200 are parallel to the long sides 111 of the frame 111, and the short sides of the protector-to-be-applied device 200 are parallel to the short sides 112 of the frame 111.

The accommodating groove 1101 penetrates the frame 11, so that the protector-to-be-applied device 200 can be directly placed in the accommodating groove 1101 of the frame 11 through any one of notches at both ends of the accommodating groove 1101, facilitating the installation between the protector-to-be-applied device 200 and the frame 11. In addition, the accommodating groove 1101 is adapted to the shape of the protector-to-be-applied device 200. Therefore, the accommodating groove 1101 can also play a role in limiting the protector-to-be-applied device 200 to a certain extent.

In an embodiment of the present disclosure, the specific structure of the frame 11 is not limited, and the frame 11 may also have other structural shapes.

The guide insert pin 20 comprises a connecting plate 21 and a guide protrusion 22. The connecting plate 21 is slidably connected to the frame 11, and the connecting plate 21 can slide back and forth relative to the frame 11. The guide protrusion 22 comprises a first protrusion 221, which is fixedly connected to the connecting plate 21. The first protrusion 221 is used to extend above the accommodating groove 1101 to be inserted between the protector-to-be-applied device 200 and a screen protector. The first protrusion 221 includes a first inclined surface 2211. The first inclined surface 2211 faces away from the accommodating groove 1101. The first inclined surface 2211 extends along the first protrusion 221 to above the accommodating groove 1101 and is inclined in a downward direction, and is arranged at a first angle with a plane where the accommodating groove 1101 is located. The first inclined surface 2211 is used to guide the screen protector to gradually detach from the first inclined surface 2211 and gradually flatly attach to a protector-to-be-applied surface of the protector-to-be-applied device 200, which prevents air bubbles from being generated between the protector-to-be-applied surface and the screen protector during the attaching process, thereby ensuring the quality of screen protector application.

In an embodiment of the present disclosure, two guide insert pins 20 are provided on the two short sides 112, respectively, and the two guide insert pins 20 can slide toward or away from each other relative to the frame 11. By providing a guide insert pin 20 on each of the two short sides 112, opposite sides of the screen protector each can be gradually flatly attached to the protector-to-be-applied surface of the protector-to-be-applied device 200 by pulling away the two guide insert pins 20, thereby allowing the air between the protector-to-be-applied surface and the screen protector to be gradually discharged, which can effectively prevent air bubbles from being generated between the protector-to-be-applied surface and the screen protector during the attaching process, thereby ensuring the quality of screen protector application. The first angle formed by the first inclined surface 2211 of the first protrusion 221 located on one short side 112 and the plane where the accommodating groove 1101 is located has an angle orientation facing away from the other short side 112. The size of the first angle can be set according to actual needs as long as it is greater than 0° and less than 90°.

Figure 4:
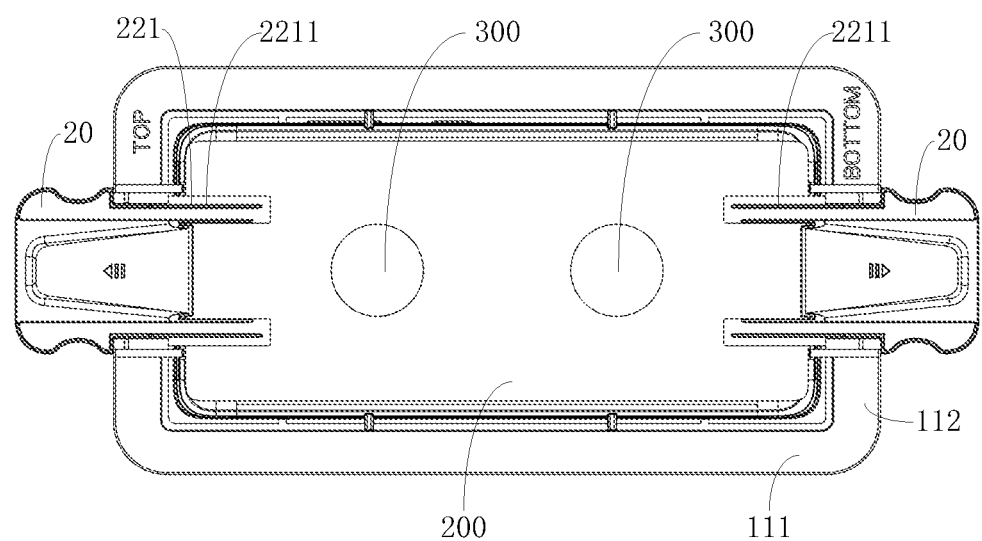
FIG. 4 is a schematic view of an initial state when two droplets of glue are dropped on the protector-to-be-applied device.
Figure 5:
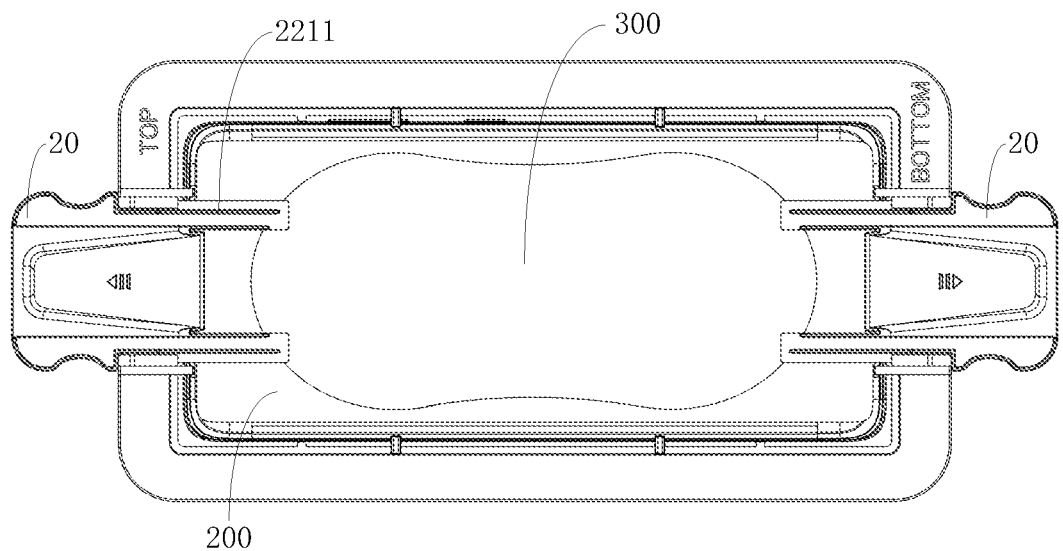
FIG. 5 is a schematic view of a state when the glue shown in FIG. 4 gradually spreads between a protector-to-be-applied surface of the protector-to-be-applied device and a screen protector, wherein the screen protector is omitted.

Please refer to FIGS. 4 and 5, wherein FIG. 4 is a schematic view of an initial state when two droplets of glue 300 are dropped on the protector-to-be-applied device 200, and FIG. 5 is a schematic view of a state when the glue 300 shown in FIG. 4 gradually spreads between the protector-to-be-applied device 200 and a screen protector, wherein the screen protector is omitted. A specific use process of the screen protector applicator 100 is exemplified below. When the screen protector is applied, the protector-to-be-applied device 200 is placed in the accommodating groove 1101, the first protrusion 221 is extended above the accommodating groove 1101, and two droplets of glue 300 are dropped on the protector-to-be-applied surface of the protector-to-beapplied device 200. The distances between each droplet of glue 300 and the two long sides 111 are roughly the same. The distance between each droplet of glue 300 and another droplet of glue 300 is roughly equal to the distance between it and an adjacent short side 112, and also roughly equal to the distance between it and each long side 111, as shown in FIG. 4. Opposite sides of the screen protector are placed on the first inclined surfaces 2211 of the two guide insert pins 20 and located above the protector-to-be-applied device 200. The first protrusion 221 is located between the protector-to-be-applied device 200 and the screen protector. The opposite sides of the screen protector are placed on the first inclined surfaces 2211 of the two guide insert pins 20, and under the action of gravity, the first inclined surface 2211 extends along the first protrusion 221 to above the accommodating groove 1101 and is inclined in a downward direction, so that the screen protector gradually bends downwards from the opposite sides toward the middle. Since the distances between each droplet of glue 300 and the two long sides 111 are roughly the same, and the distance between each droplet of glue 300 and the other droplet of glue is roughly equal to the distance between it and the adjacent short side 112, the two droplets of glue 300 are located on both sides of the middle of the screen protector. The first protrusion 221 is gradually pulled away from between the protector-to-be-applied device 200 and the screen protector, so that the screen protector gradually detaches from the first inclined surface 2211, and the both sides adjacent to the middle of the screen protector first come into contact with the two droplets of glue 300. As the screen protector gradually detaches from the first inclined surface 2211, the screen protector squeezes two droplets of glue 300. Moreover, since the two droplets of glue 300 are located on both sides of the middle of the screen protector, the pressure on each droplet of glue 300 is greater, so that each droplet of glue 300 accelerates to spread around. The two droplets of glue first spread to the middle of the screen protector and mix together. Due to the large amount of glue at the mixture point, it will accelerate the squeezing out of the air in the middle of the screen protector, as shown in FIG. 5. After that, glue 300 gradually spreads to the opposite sides of the screen protector. Because the opposite sides of the screen protector are supported by the first protrusions 221 of the two guide insert pins 20, the opposite sides of the screen protector slightly bend upwards relative to the middle of the screen protector. Therefore, the bend of the screen protector close to the protector-to-be-applied surface of the protector-to-be-applied device 200 is under greater pressure, which will accelerate the squeezing out of air located on opposite sides of the screen protector. Moreover, under the guidance of the first inclined surface 2211, the opposite sides of the screen protector are gradually flatly attached to the protector-to-be-applied surface of the protector-to-be-applied device 200 from the middle of the screen protector towards the opposite sides of the screen protector during the diffusion of the glue 300, and the air on the opposite sides of the screen protector is gradually squeezed out to prevent air bubbles from appearing in the flat attachment process. When the screen protector is completely separated from the first inclined surface 2211, the glue 300 covers the protector-to-be-applied surface of the protector-to-be-applied device 200, the air between the protector-to-be-applied surface of the protector-to-be-applied device 200 and the screen protector is completely discharged, and the screen protector is completely attached to the protector-to-be-applied surface of the protector-to-be-applied device 200. Since the distance between each droplet of glue 300 and another droplet of glue 300 is roughly equal to the distance between it and the adjacent short side 112, and also roughly equal to the distance between it and each long side 111, the glue 300 makes the air between the protector-to-be-applied surface of the protector-to-be-applied device 200 and the screen protector completely discharged, and when the screen protector is completely attached to the protector-to-be-applied surface of the protector-to-be-applied device 200, the glue 300 will have no or less overflow from the two long sides 111.

It can be understood that, when a screen protector is applied, the number of glue droplets on the protector-to-be-applied surface of the protector-to-be-applied device 200 can be selected according to actual needs, and is not limited to two. It may also be three or more.

In this embodiment, the screen protector applicator 100 further comprises an adsorbing member, each long side 111 is provided with a through groove 1102, and the through groove 1102 penetrates the long side 111. When the screen protector is applied, the adsorbing member is inserted into the through groove 1102. The adsorbing member is used to adsorb the glue overflowing between the protector-to-be-applied device 200 and the screen protector from the side. The adsorbing member may be a material with adsorbing ability, such as paper and cotton.

Regarding the aforementioned connecting plate 21, the connecting plate 21 comprises a connecting portion 211 and a push-pull portion 212, and two connecting portions 211 are fixedly connected to opposite sides of the push-pull portion 212, respectively.

The connecting portion 211 is slidably connected to the frame 11, and the connecting portion 211 can slide back and forth relative to the frame 11, so that the guide insert pin 20 can slide back and forth relative to the frame 11. As a result, the first protrusion 221 can be extended above the accommodating groove 1101 or away from the accommodating groove 1101.

In some other embodiments of the present disclosure, the push-pull portion 212 is slidably connected to the frame 11, and the push-pull portion 212 can slide back and forth relative to the frame 11, so that the guide insert pin 20 can slide back and forth relative to the frame 11.

An operator can push and pull the push-pull portion 212 so that the guide insert pin 20 slides back and forth relative to the frame 11. A side of the push-pull portion 212 facing away from the frame 11 is provided with a friction portion 2121, and the friction portion 2121 is used to increase friction force in contact with the push-pull portion 212 to facilitate the operator to push and pull the push-pull portion 212. In this embodiment, the friction portion 2121 is a plurality of grooves arranged adjacently.

In some other embodiments of the present disclosure, the friction portion 2121 may be other structures for increasing the friction force in contact with the push-pull portion 212, such as protrusions and abrasive sand.

In this embodiment, each guide protrusion 22 comprises two first protrusions 221 spaced apart, and the two first protrusions 221 can jointly support the screen protector, so that a part of the screen protector between the two first protrusions 221 can bend toward the protector-to-be-applied surface of the protector-to-be-applied device 200 relative to both sides of the screen protector facing away from the two first protrusions 221. In the process of pulling away the guide protrusion 22, a part of the screen protector located on the two first protrusions 221 can be gradually flatly attached to the protector-to-be-applied surface from the middle of the two first protrusions 221 towards the two first protrusions 221, thereby enhancing the guidance of the guide protrusion 22 to the screen protector and the slow-release effect of the glue when spreading between the screen protector and the protector-to-be-applied device 200. The two first protrusions 221 are fixedly connected to the two connecting portions 211, respectively.

In some other embodiments of the present disclosure, the number of the first protrusions 221 can be selected according to actual needs, and is not limited to two.

In this embodiment, each guide protrusion 22 further comprises two second protrusions 222 spaced apart. The second protrusions 222 are fixedly connected to the connecting plate 21, and the two second protrusions 222 are located between the two first protrusions 221. The two second protrusions 222 support the part of the screen protector between the two first protrusions 221 to prevent the part of screen protector in the middle of the first protrusion 221 from collapsing too much and first flatly attaching to the protector-to-be-applied surface of the protector-to-be-applied device 200, thereby ensuring that both sides of the screen protector can be slowly and flatly attached to the protector-to-be-applied device 200 as a whole when pulling away the guide protrusion 22. The second protrusion 222 is provided with a second inclined surface 2221. The second inclined surface 2221 extends along the second protrusion 222 to above the accommodating groove 1101 and is inclined in a downward direction. It is arranged at a second angle with the accommodating groove 1101, and the second angle is smaller than the first angle to allow the part of the screen protector located between the two first protrusions 221 to slightly collapse, and be slowly flatly attached to the protector-to-be-applied surface from the middle part of the two first protrusions 221 towards the two first protrusions 221. The two second protrusions 222 are fixedly connected to surfaces of the two connecting portions 211 facing away from the accommodating groove 1101, respectively, wherein the second angle formed by the second inclined surface 2221 of the second protrusion 222 located on one short side 112 and a plane where the accommodating groove 1101 is located has an angle orientation facing away from the other short side 112. The size of the second angle can be set according to actual needs, as long as it is greater than 0° and less than 90°, and less than the first angle.

In this embodiment, the angle formed by the first inclined surface 2221 and the surface of the connecting portion 211 is the first angle, and the angle formed by the second inclined surface 2221 and the surface of the connecting portion 211 is the second angle.

In some other embodiments of the present disclosure, the number of the second protrusions 222 can be selected according to actual needs, and is not limited to two.

Further, each connecting portion 211 extends out from the push-pull portion 212. The two first protrusions 221 and the two second protrusions 222 are fixedly connected in pairs to the surfaces of the parts of the two connecting portions 211 extending out from the push-pull portion 212. That is, one first protrusion 221 and one second protrusion 222 are fixedly connected to a surface of a part of one connecting portion 211 extending out from the push-pull portion 212 that faces away from the accommodating groove 1101, and the other first protrusion 221 and the other second protrusion 222 are fixedly connected to a surface of a part of the other connecting portion 211 extending out from the push-pull portion 212 that faces away from the accommodating groove 1101. The first protrusion 221 and the second protrusion 222 are provided on the part of the connecting portion 211 extending out from the push-pull portion 212, so that the contact area between the connecting plate 21 as a whole and the protector-to-be-applied device 200 can be prevented from being too large to increase friction force, and at the same time, the difficulty of pulling away the guide protrusion 22 is reduced.

In this embodiment, the length directions of the first protrusions 221 and the second protrusions 222 are arranged in parallel with the extension direction of the connecting portion 211. The first inclined surface 2211 entirely covers a side of the first protrusion 221 facing away from the connecting portion 211. The second inclined surface 2221 entirely covers a side of the second protrusion 222 facing away from the connecting portion 211.

Furthermore, the part of the connecting portion 211 extending out from the push-pull portion 212 has an end 2111 away from the push-pull portion 212. The first inclined surface 2211 is closer to the end 2111 than the second inclined surface 2221. In the extension direction of the connecting portion 211, a preset separation distance is left between the end of the first inclined surface 2211 close to the end 2111 and the end of the second inclined surface 2221 close to the end 2111, so that the screen protector within the preset distance is closer to the protector-to-be-applied surface of the protector-to-be-applied device 200, which is helpful for the screen protector to be slowly attached to the protector-to-be-applied device 200 from within the preset distance toward the push-pull portion 212 and toward two sides of the two first protrusions 221 facing away from each other. The size of the preset distance can be set according to actual needs.

The guide insert pin 20 further comprises an abutting portion 23 fixedly connected to the connecting plate 21. The tray 10 further comprises a limiting plate 12 fixedly connected to the frame 11. The abutting portion 23 is used for abutting against the limiting plate 12 to limit the movement stroke of the guide insert pin 20 relative to the tray 10, so that the guide protrusion 22 just extends to a preset position above the accommodating groove 1101, preventing the guide insert pin 20 from sliding into the accommodating groove 1101 as a whole. The abutting portion 23 extends from a side of the connecting portion 211 facing away from the protector-to-be-applied device 200 towards a direction away from the protector-to-be-applied device 200. Two abutting portions 23 are fixedly connected to the two connecting portions 211, respectively.

Figure 6:
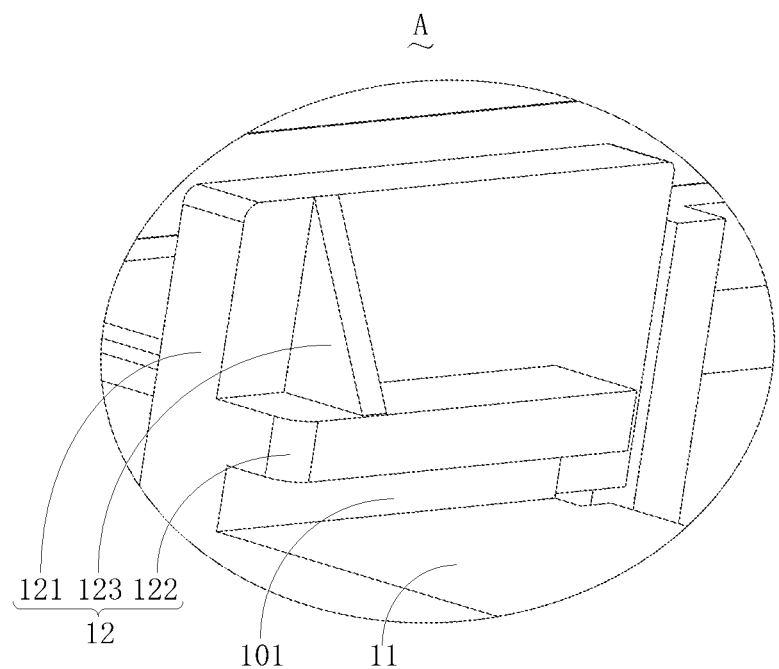
FIG. 6 is a partial enlarged view of part A of FIG. 2.

Refer to FIG. 6, which is a partial enlarged view of part A of FIG. 2. The tray 10 is provided with a limiting groove 101. The connecting plate 21 is slidably inserted into the limiting groove 101. The limiting groove 101 is used to limit the sliding direction of the guide insert pin 20 relative to the tray 10, so that the guide protrusion 22 can be smoothly pulled away from between the protector-to-be-applied device 200 and the screen protector.

Specifically, two limiting plates 12 are arranged opposite each other. Each limiting plate 12 comprises a vertical plate 121 and a horizontal plate 122. One end of the vertical plate 121 is fixedly connected to the frame 11, and one end of the horizontal plate 122 is fixedly connected to a side wall of the vertical plate 121. The vertical plate 121, the horizontal plate 122 and the frame 11 enclose to form a limiting groove 101 therebetween. Opposite sides of the connecting plate 21 are inserted into the limiting grooves 101 of the two oppositely arranged limiting plates 12, respectively. A gap is provided between the connecting plate 21 and the horizontal plate 122. The gap is used to allow the connecting plate 21 to have a certain inclined sliding space in the limiting groove 101, so that the downward inclination angle of the guide protrusion 22 in the limiting groove 101 when it extends above the accommodating groove 1101 can be adjusted according to actual needs, so as to adapt to protector-to-be-applied devices 200 with different thicknesses. Of course, the connecting plate 21 may also slide in the limiting groove 101 in parallel with an upper surface of the protector-to-be-applied device 200. The connecting portions 211 on the opposite sides of the push-pull portion 212 are each slidably inserted into the limiting groove 101 on a corresponding limiting plate 12.

In some other embodiments of the present disclosure, the limiting groove 101 may also be directly provided in the frame 11, and the connecting plate 21 is directly slidably connected to the limiting groove 101 on the frame 11.

Preferably, the vertical plate 121 and the horizontal plate 122 are arranged perpendicular to each other, and the vertical plate 121 is perpendicular to the frame 11.

The limiting plate 12 further comprises a baffle 123, which is fixedly connected to a side of the horizontal plate 122 facing away from the limiting groove 111. The baffle 123 is used to block the connecting plate 21 from passing through and prevent the connecting plate 21 from extending above the accommodating groove 1101 from a side of the horizontal plate 122 facing away from the limiting groove 111, so that the connecting plate 21 between the two opposite limiting plates 12 can only extend along the limiting groove 111 above the accommodating groove 1101, thereby avoiding the occurrence of maloperation.

Figure 7:
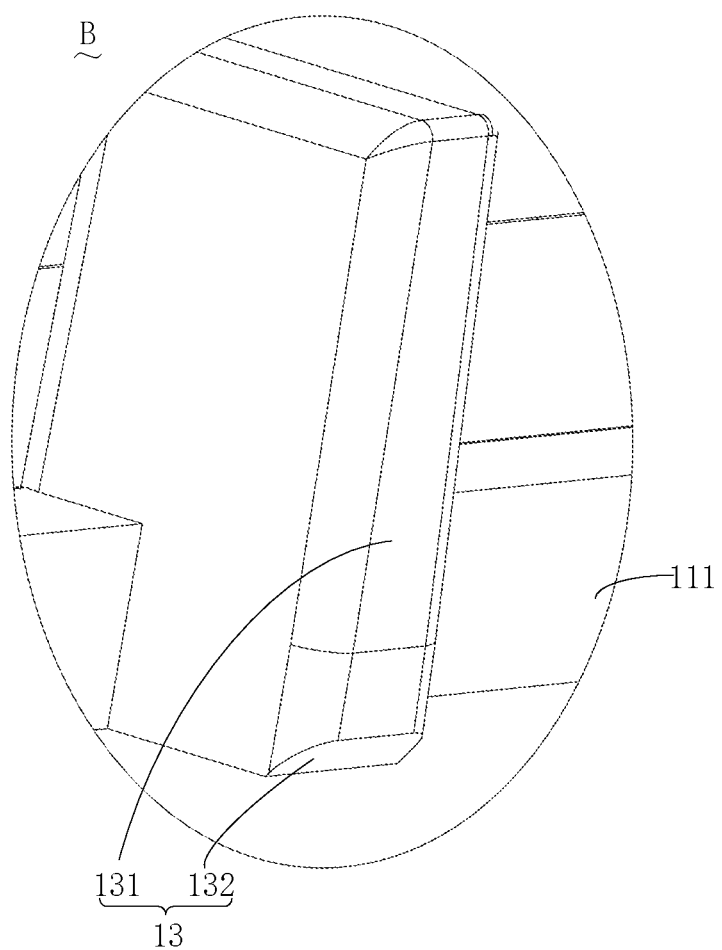
FIG. 7 is a partial enlarged view of part B of FIG. 2.

Refer to FIG. 7, which is a partial enlarged view of part B of FIG. 2. The tray 10 further comprises a limiting protrusion 13. A plurality of limiting protrusions 13 are each fixedly connected to the long side 111 of the frame 11. The limiting protrusion 13 is used to play a role in limiting the protector-to-be-applied device 200, so that the position of the protector-to-be-applied device 200 relative to the frame 11 is fixed, thereby facilitating the work of applying the screen protector.

Specifically, the limiting protrusion 13 is formed to extend from an inner side wall of the long side 111 of the frame 11 toward a side wall of the protector-to-be-applied device 200. The limiting protrusion 13 partially extends into the accommodating groove 1101. The limiting protrusion 13 is used to abut against the side wall of the protector-to-be-applied device 200 to realize the limiting function of the protector-to-be-applied device 200. The limiting protrusion 13 includes a guide surface 131 perpendicular to the protector-to-be-applied surface of the protector-to-be-applied device 200. The guide surface 131 is used for guiding the screen protector to be placed above the protector-to-be-applied surface of the protector-to-be-applied device 200.

The limiting protrusion 13 further includes an abutting surface 132, which is located at the junction of the guide surface 132 and the bottom of the limiting protrusion 13. The abutting surface 132 is adapted to the face angle of the protector-to-be-applied device 200. The shape of the abutting surface 132 can be set according to the dihedral angle of the protector-to-be-applied device 200, and it may be a curved surface, a right-angled surface, etc., to better limit the protector-to-be-applied device 200.

In this embodiment, the number of the limiting protrusions 13 is 4, wherein two limiting protrusions 13 are located on one long side 111 of the frame 11, and the other two limiting protrusions 13 are located on the other long side 111 of the frame 11.

In order to ensure the structural reliability of the tray 10 and the guide insert pin 20, the tray 10 and the guide insert pin 20 may each be an integrated structure.

In addition, this embodiment further provides a method of applying a screen protector onto a screen of a cell phone by using the screen protector applicator. Specific steps of the method are as follows:

Before the screen protector application, leveling pads may be applied to a side of the cell phone opposite to a protector-to-be-applied surface of the cell phone so that the cell phone remains level, and the protector-to-be-applied surface of the cell phone may be cleaned in any manner known to those skilled in the art.

Next, a user places the tray of the screen protector applicator on the cell phone, so that the protector-to-be-applied surface of the cell phone is located in the accommodating groove of the tray. Then, the user inserts a guide insert pin on each end of the tray. At this time, the connecting plate of the guide insert pin is slidably connected to the frame of the tray. After that, the user may insert an adsorbing member such as paper and cotton into the through groove provided on the long side of the tray. The adsorbing member is used to adsorb the glue overflowing between the cell phone and the screen protector from the side.

Then, the user drops two droplets of glue on the protector-to-be-applied surface of the cell phone, so that the distance between each droplet of glue and one long side of the frame is equal to the distance between the droplet of glue and the other long side of the frame, and the distance between each droplet of glue and the other droplet of glue is equal to the distance between the droplet of glue and an adjacent short side of the frame. After that, the user places a screen protector on the protector-to-be-applied surface of the cell phone, so that opposite sides of the screen protector are placed on the first inclined surfaces of the two guide insert pins, and the guide protrusions are located between the cell phone and the screen protector.

Finally, the user pulls away the two guide insert pins from the tray at the same time. During the process of pulling away the guide insert pins, both ends of the screen protector are gradually flatly attached to the protector-to-be-applied surface of the cell phone, thereby allowing the air between the cell phone and the screen protector to be gradually discharged. As a result, air bubbles can be effectively prevented from being generated between the cell phone and the screen protector during the application process, thereby ensuring the quality of screen protector application. In addition, since the guide insert pin is provided with the first inclined surface, when the first protrusion is gradually pulled away from between the cell phone and the screen protector, the screen protector can be gradually flatly attached to the cell phone along the first inclined surface, further preventing air bubbles from being generated between the cell phone and the screen protector during the application process, thereby further ensuring the quality of screen protector application.

The descriptions above are only embodiments of the present disclosure. It is not intended not limit the scope of the patent of the present disclosure. Any equivalent structure or equivalent process transformation made by using the description and drawings of the present disclosure, or directly or indirectly applied to other related technical fields, is similarly included in the scope of patent protection of the present disclosure.

What is claimed is:

1. A screen protector applicator, comprising:
   a frame configured to accommodate a mobile device; and
   guide insert pins slidably attached to the frame on opposite sides of the frame;

wherein the guide insert pins are configured to support a screen protector thereon such that the screen protector is separate from and parallel to a screen of the mobile device;

wherein the guide insert pins are configured to cause the screen protector to approach the screen and to keep the screen protector parallel to the screen, while the guide insert pins are being moved away from one another.

2. The screen protector applicator of claim 1, wherein each of the guide insert pins comprises a surface inclined toward the screen and the guide insert pins are configured to support the screen protector with the surfaces.

3. The screen protector applicator of claim 2, wherein the surface comprises two edge portions and a center portion between the edge portions; wherein an acute angle between the center portion and the screen is smaller than an acute angle between the edge portions and the screen.

4. The screen protector applicator of claim 1, wherein the guide insert pins are configured to be removed from the frame by moving away from one another.

5. The screen protector applicator of claim 1, wherein the guide insert pins are slidably attached to the frame by limiting grooves on the frame.

6. The screen protector applicator of claim 5, wherein each of the guide insert pins comprises a connecting plate with a connecting portion; wherein the connecting portions of the guide insert pins are accommodated by the limiting grooves.

7. The screen protector applicator of claim 6, wherein the connecting plate comprises a push-pull portion; wherein the push-pull portion is configured to engage a finger of a user.

8. The screen protector applicator of claim 1, wherein the frame comprises a through groove configured to accommodate an adsorbing member.

9. The screen protector applicator of claim 1, wherein each of the guide insert pins comprises an abutting portion configured to limit movement of the guide insert pins toward one another.

10. A method of using the screen protector applicator of claim 1, the method comprising:
    placing the mobile device into the frame;
    placing the screen protector on the guide insert pins; and
    causing the screen protector to approach the screen while keeping the screen protector parallel to the screen, by moving the guide insert pins away from one another.

11. The method of claim 10, further comprising applying multiple drops of glue on the screen.

12. The method of claim 10, further comprising causing the screen protector to approach the screen until the screen protector contacts the screen.

13. The method of claim 10, further comprising placing an absorbing member along the frame.

14. The method of claim 10, further comprising leveling the screen.

15. The method of claim 10, further comprising removing dust from the screen.

16. The method of claim 10, wherein each of the guide insert pins comprises a surface inclined toward the screen and the guide insert pins are configured to support the screen protector with the surfaces.

17. The method of claim 16, wherein the surface comprises two edge portions and a center portion between the edge portions; wherein an acute angle between the center portion and the screen is smaller than an acute angle between the edge portions and the screen.

* * * * *